United States Patent
Zingsem et al.

(10) Patent No.: US 8,870,156 B2
(45) Date of Patent: Oct. 28, 2014

(54) DRIVE MEANS FOR A SLIDE VALVE AND A SLIDE VALVE

(75) Inventors: Wolfgang Zingsem, Juelich (DE); Ludwig Kesternich, Huertgenwald (DE)

(73) Assignee: Z & J Technologies GmbH, Dueren (DE)

( * ) Notice: Subject to any disclaimer, the term of this patent is extended or adjusted under 35 U.S.C. 154(b) by 200 days.

(21) Appl. No.: 13/342,701

(22) Filed: Jan. 3, 2012

(65) Prior Publication Data

US 2012/0181461 A1 Jul. 19, 2012

(30) Foreign Application Priority Data

Jan. 17, 2011 (DE) .......................... 10 2011 000 170
Mar. 10, 2011 (DE) .......................... 10 2011 001 186

(51) Int. Cl.
*F16K 31/44* (2006.01)
*C10B 25/10* (2006.01)
*F16K 3/02* (2006.01)
*F16K 31/50* (2006.01)

(52) U.S. Cl.
CPC ............... *F16K 3/0281* (2013.01); *C10B 25/10* (2013.01); *F16K 31/508* (2013.01)
USPC ........................ 251/249.5; 251/326; 74/841

(58) Field of Classification Search
CPC ..... F16K 3/0281; F16K 3/0254; F16K 3/316; F16K 31/508; F16K 31/50; F16K 3/30; C10B 25/10; C10B 25/14
USPC .............. 251/249.5, 264, 326, 215, 248, 327, 251/328, 329, 229, 267; 74/841, 27, 49, 74/424.6
See application file for complete search history.

(56) References Cited

U.S. PATENT DOCUMENTS

| | | | |
|---|---|---|---|
| 4,041,899 A * | 8/1977 | Wolfe et al. | ................... 239/752 |
| 4,054,261 A | 10/1977 | Gilmore et al. | |
| 4,253,483 A | 3/1981 | Cornelius | |

(Continued)

FOREIGN PATENT DOCUMENTS

| | | |
|---|---|---|
| DE | 1 898 716 | 8/1964 |
| WO | WO 2010/111188 | 9/2010 |

OTHER PUBLICATIONS

"articulated." Dictionary.com Unabridged. Random House, Inc. Apr. 10, 2014. <Dictionary.com http://dictionary.reference.com/browse/articulated>.*

(Continued)

*Primary Examiner* — John K Fristoe, Jr.
*Assistant Examiner* — Andrew J Rost
(74) *Attorney, Agent, or Firm* — Alston & Bird LLP (57) ABSTRACT

The invention relates to a drive means for a slide valve having two parallel spindles (10) which are driven in rotation by at least one motor (11), travelling nuts (12) which engage the spindles (10) and are movable in the longitudinal direction of the spindles by rotation of the spindles (10), and a cross-yoke (13) which is arranged transversely with respect to the spindles (10) and is connected to the travelling nuts (12) on the one hand and to a rod (14) on the other hand, which rod is arranged in parallel between the spindles (10) and is connected or connectible to a slide plate, the rod (14) being axially movable by the motor (11) for the actuation of the slide plate. It is distinguished by the fact that the travelling nuts (12) and the rod (14) are each articulatedly connected to the cross-yoke (13).

14 Claims, 7 Drawing Sheets

(56) References Cited

U.S. PATENT DOCUMENTS

| | | | | |
|---|---|---|---|---|
| 4,474,205 | A | * | 10/1984 | Dreyer et al. ............ 137/315.31 |
| 4,582,296 | A | * | 4/1986 | Bachmann .................... 251/326 |
| 4,724,863 | A | * | 2/1988 | Connor ......................... 137/240 |
| 4,783,048 | A | * | 11/1988 | St. Clair ................... 251/129.11 |
| 5,271,602 | A | * | 12/1993 | Funaba ..................... 251/335.3 |
| 6,299,133 | B2 | * | 10/2001 | Waragai et al. ............... 251/193 |
| 7,766,305 | B2 | * | 8/2010 | Kim .............................. 251/203 |

OTHER PUBLICATIONS

"joint." Dictionary.com Unabridged. Random House, Inc. Apr. 10, 2014. <Dictionary.com http://dictionary.reference.com/browse/joint>.*

* cited by examiner

DRIVE MEANS FOR A SLIDE VALVE AND A SLIDE VALVE

CROSS-REFERENCE TO RELATED APPLICATIONS

This application claims priority to German Application Nos. DE 10 2011 000 170.0 filed Jan. 17, 2011 and DE 10 2011 001 186.2 filed Mar. 10, 2011, both of which are hereby incorporated by reference herein in their entirety.

BACKGROUND

1. Technical Field

That problem is solved according to the invention by the drive means and by the slide valve in accordance with the claims recited herein. The invention is based on the concept of providing for a slide valve a drive means that has two parallel spindles, especially each having a trapezoidal thread, which are driven in rotation by a motor. The drive means has travelling nuts which engage the spindles and are movable in the longitudinal direction of the spindles by rotation of the spindles, and a cross-yoke which is arranged transversely with respect to the spindles and is connected to the travelling nuts on the one hand and to a rod on the other hand. The rod is arranged in parallel between the spindles and is connected or connectible to a slide plate, the rod being axially movable by the motor for the actuation of the slide plate. The travelling nuts and the rod are each articulatedly connected to the cross-yoke, for example by way of pivot pins and by way of guide slots and sliding blocks. By virtue of those articulated connections of the travelling nuts and the rod to the cross-yoke, a skewed position of the cross-yoke, which can occur, for example, if the two travelling nuts do not operate synchronously or if the two spindles have not been mounted exactly in parallel, is compensated for. The articulated connections allow a rotational movement of the cross-yoke out of its normal position perpendicular to the spindles into a skewed position, without giving rise to significant moments that result in canting of the yoke or jamming of the travelling nuts. Since both the travelling nuts and the rod are articulatedly connected to the yoke, the cross-yoke can rotate freely on the input and output sides. It will be understood that the rotational movement of the cross-yoke is not entirely free, but is limited by the geometry of the spindle arrangement. Canting is in any case adequately prevented by the articulated connection, which improves reliable operation of the slide valve and largely avoids downtimes.

2. Description of Related Art

For controlling flows of gas and solids in the iron and steel industries and also in the chemical and petrochemical industries it is known to use slide valves which have a slide plate displaceably mounted in a housing, which slide plate unblocks or closes a valve opening in the housing by means of a stroke movement. Such valves are intended to allow long maintenance-free operating times at high operating temperatures, large nominal diameters and high numbers of switching operations. In addition, it is generally required that the overall height of the valves be low.

As regards the drive means of the slide plate, hydraulic or electromechanical systems are known. An example of an electromechanical system is described in U.S. Pat. No. 4,054,261, which is mentioned at the beginning. That drive means comprises a double-spindle system having a common drive motor which, by way of an angular gear, causes the two spindles to perform synchronous rotational movements. On the spindles, which are arranged in fixed position, there are arranged travelling nuts which are fixedly connected to a cross-member. Movement of the spindles causes the travelling nuts and the cross-member to move in the longitudinal direction of the spindles. The cross-member is in turn connected to two push rods which are attached to the distal end of the slide plate. The movement of the cross-member effects the stroke movement of the slide plate that is required to open and close the slide valve.

If the synchronous operation of the two spindles is interrupted, the position of the two travelling nuts relative to one another is altered and the cross-member becomes canted. The jammed drive means is unable to operate, resulting in expensive downtimes. Canting of the cross-member may also occur if, during the stroke movement of the slide plate, force is introduced asymmetrically into the cross-member, with the result that different forces act on the travelling nuts.

A further slide valve for industrial valve fittings is known from U.S. Pat. No. 4,253,483, in which a spindle is arranged on each side of a pipe duct in the slide valve. The travelling nuts seated on the spindles are connected to telescopic tubes which are attached to a slide plate. During the stroke movement for closing or opening the valve the telescopic tubes are pulled over the spindles, so that the spindles and the telescopic tubes are arranged concentrically. The manufacturing outlay for such telescopic systems is relatively great, especially when it is considered that the two telescopic tubes each require their own guide means.

Further spindle drive means for slide valves are known, for example, from DE 1 898 716 U1, which originates from the applicant, and WO 2010/111188 A2. Both cases involve single spindles which are connected by way of a travelling nut to a telescopic tube which, in turn, is connected to the slide plate. Such single spindles need to be of relatively large dimensions in order to be able to transfer the forces required for the stroke movement of the slide plate.

BRIEF DESCRIPTION

The problem of the invention is therefore to provide a drive means for a slide valve which is reliable in operation and has an overall length that is as small as possible. A further problem of the invention is to provide a slide valve having such a drive means.

The invention relates to a drive means for a slide valve having the features of the preamble of the claims recited herein. Such a drive means is known, for example, from U.S. Pat. No. 4,054,261. The invention relates also to a slide valve having such a drive means.

The double spindles together with the rod, arranged in parallel between the spindles, for actuating the slide plate enable the drive means to be very compact, in particular to have a very short overall length. By virtue of the double spindles it is possible for especially large drive forces to be transmitted, so that the drive means can also be used for valves having large nominal diameters. The invention therefore combines the advantages of spindle drive means that arise from the short overall length and the transmission of large forces with the advantage of reliable operation.

An advantageous construction in accordance with the invention provides that the travelling nuts each have at least one pivot pin which is mounted in the cross-yoke so as to be pivotable about a first pivot axis, the first pivot axis running perpendicular to the spindles in each case. The ability of the travelling nuts to rotate about the first pivot axis, which runs perpendicular to the spindles, means that in the event of a skewed position of the cross-yoke relative to the spindles the introduction of moments when, for example, the travelling nuts are moved at different speeds is avoided. In a further, preferred embodiment, the travelling nuts are mounted so as to be axially movable in the longitudinal direction of the cross-yoke, especially mounted so as to be axially movable in addition to the pivotal mounting mentioned above. The axially movable mounting can be achieved, for example, by means of sliding blocks which are movably fitted in guide slots located in the cross-yoke and are displaceable axially relative to the cross-yoke. By virtue of the axial movability of the sliding blocks in the guide slots in the cross-yoke together with the ability of the travelling nuts to rotate about the first pivot axis running perpendicular to the spindles, the introduction of moments into the spindles is effectively avoided.

An especially robust mounting arrangement of the travelling nuts is achieved by the travelling nuts advantageously each having two pivot pins which are arranged opposite one another and are both mounted in the cross-yoke so as to be pivotable about the same first pivot axis. In a further construction in accordance with the invention the two pivot pins can be mounted in two sliding blocks which are displaceable along the same horizontal axis, i.e. along the longitudinal axis of the cross-yoke. The pivot pins are therefore both mounted in the cross-yoke so as to be pivotable about the same first pivot axis and displaceable along the longitudinal axis of the cross-yoke.

In an especially preferred construction, the cross-yoke has apertures in which sliding blocks are arranged so as to be axially movable in the longitudinal direction A of the cross-yoke, the travelling nuts each being mounted between the sliding blocks so as to be fixed against rotation about the longitudinal axis of the spindles but rotatable about a pivot axis running perpendicular to the longitudinal axis of the spindles, especially about the first pivot axis D1.

The articulated connection of the rod to the cross-yoke can be achieved, for example, by connection of the free end of the rod to the cross-yoke by way of a pivot joint which is movable about a second pivot axis running perpendicular to the rod. As in the case of the travelling nuts, the pivot joint prevents a moment resulting from a skewed position of the cross-yoke from being introduced into the rod.

The spindles can preferably be connected to the motor by a common drive shaft, especially a worm shaft, with the result that the synchronous operation of the two spindles is achieved in a simple way.

An advantageous construction in accordance with the invention provides that the spindles are mounted in a frame by means of spindle bearings and are connected to drive gears, the frame comprising a front plate connectible to the housing of a slide valve and a parallel rear plate spaced apart therefrom. The housings of the drive gears are attached to the front plate and the spindle bearings are attached to the rear plate. Such a construction has proved advantageous with regard to simple mounting of the spindle arrangement, because the individual drive components in the frame are easily accessible.

The motor is preferably an electric motor, a pneumatic motor or a hydraulic motor.

BRIEF DESCRIPTION OF THE FIGURES

The invention is explained and described in greater detail below on the basis of an exemplary embodiment shown in the drawings, wherein.

DETAILED DESCRIPTION OF VARIOUS EMBODIMENTS

Figure 1:
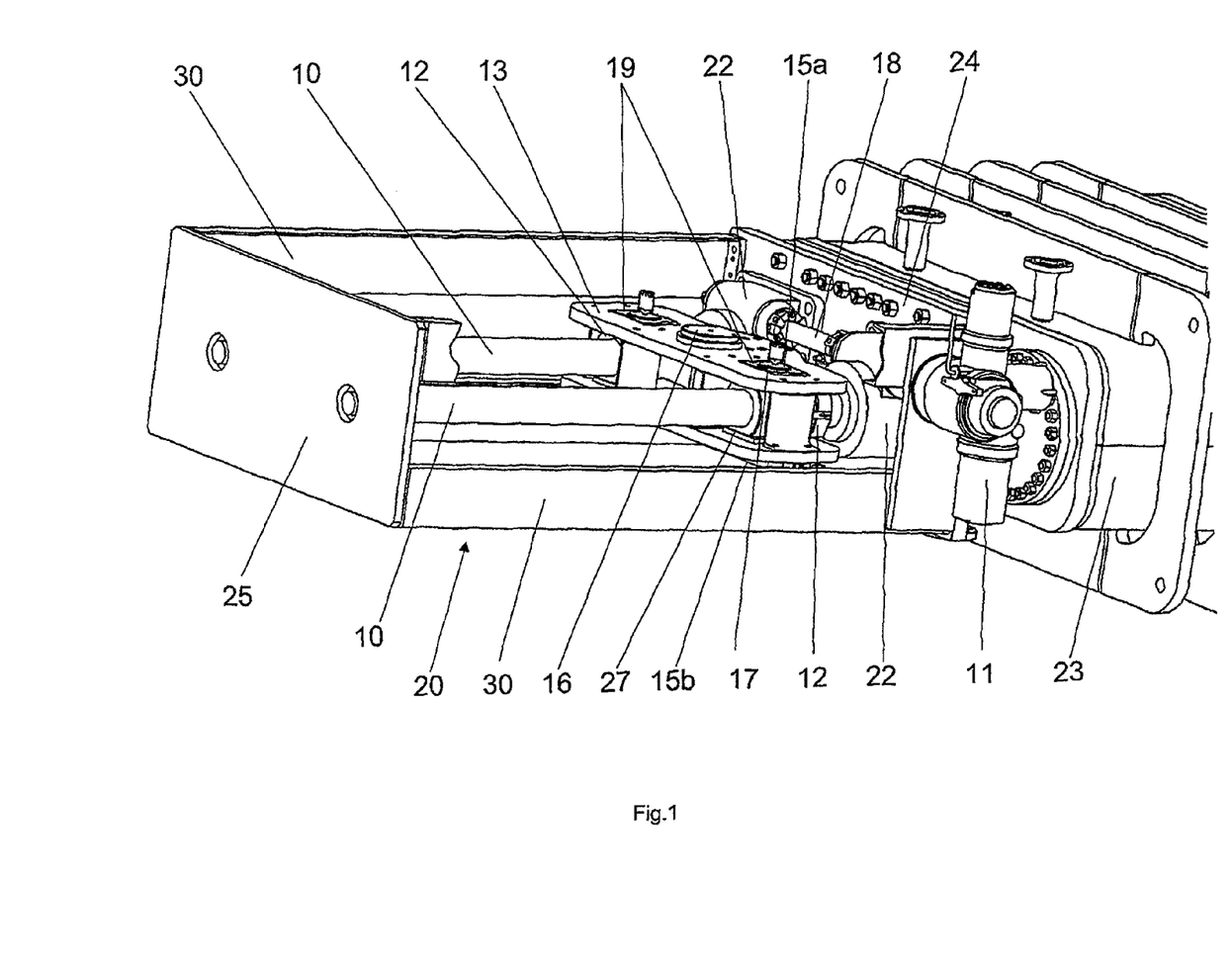
FIG. 1 is a perspective view of a drive means in the closed position of the valve in accordance with an exemplary embodiment according to the invention.

FIG. 1 shows a perspective view of a drive means for a slide valve 1, or a slide valve 1 having a drive means used in plant construction, for example in the chemical and petrochemical industries. The slide valve 1 can be, for example, a coker slide valve or a pipe bridge slide valve. Such pipe bridge slide valves are manufactured by the applicant. The drive means can be employed for other slide valves or for valves in plant construction, because they are suitable for use for a variety of valve fittings. The drive means is especially suitable for delayed coker operation.

Figure 6A:
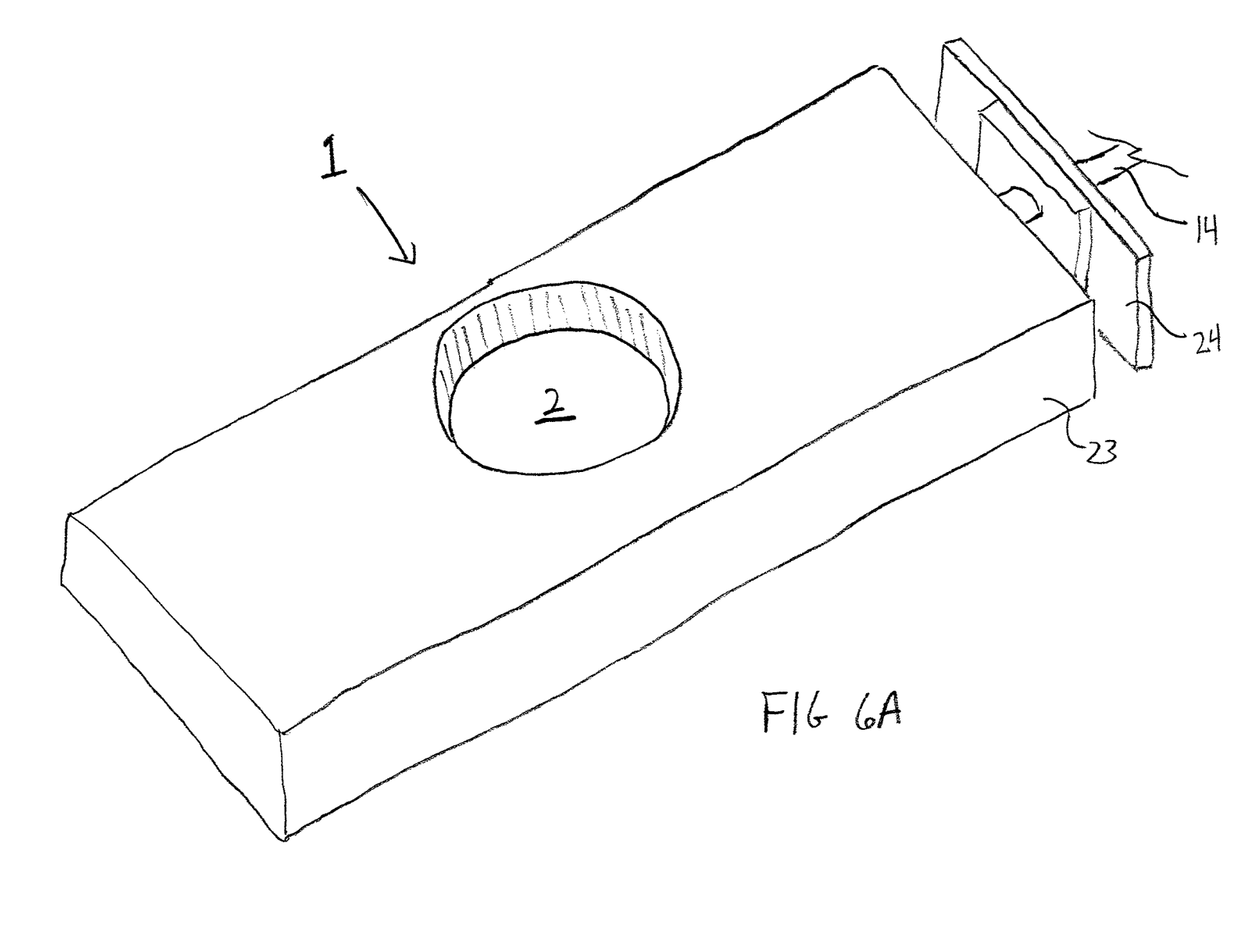
FIG. 6A is a perspective view of a slide valve 1 having a slide plate 2 and a pipe opening 3, the slide plate being positioned in this illustrated configuration to close the pipe opening.
Figure 6B:
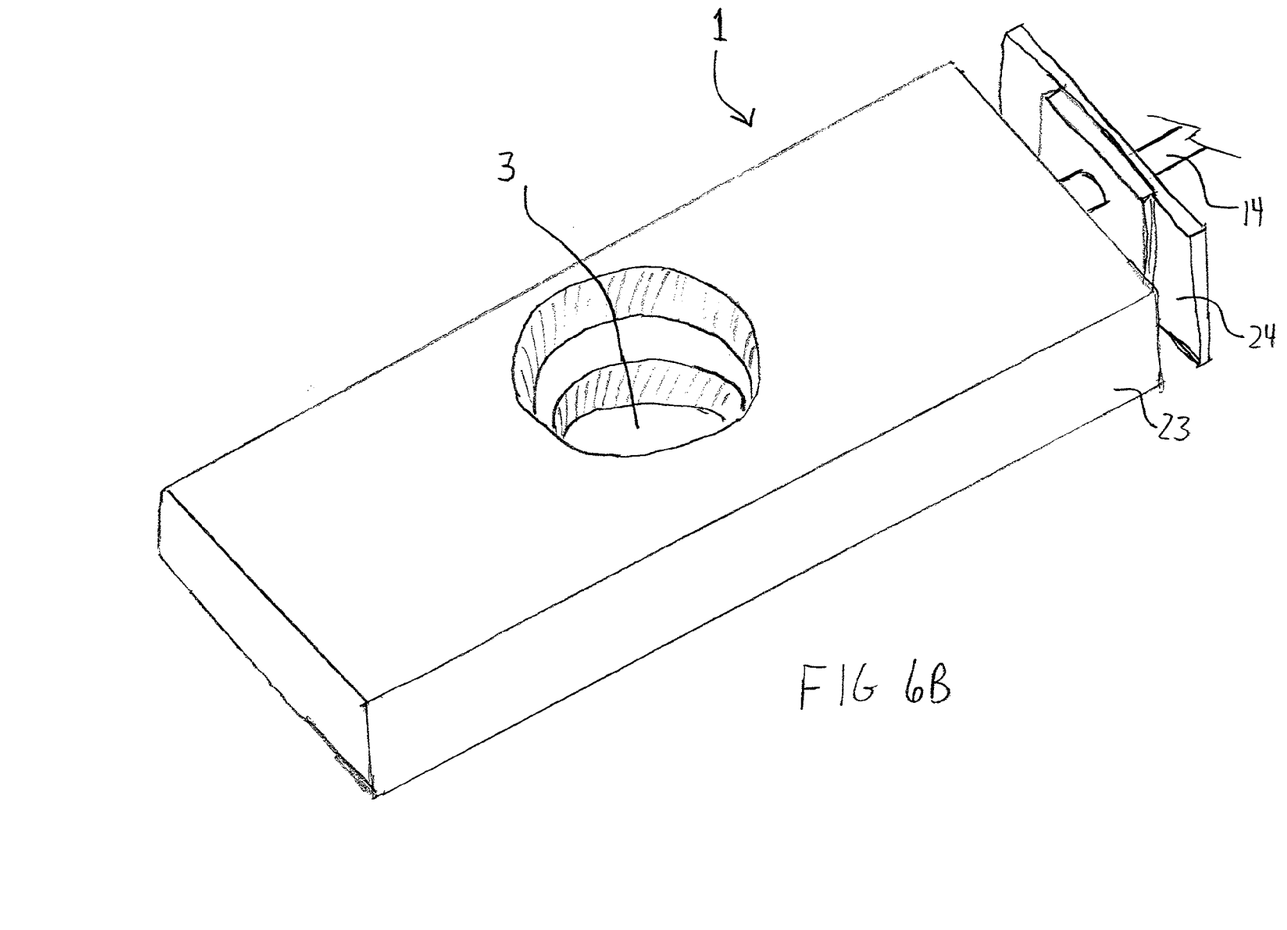
FIG. 6B is a perspective view of the slide valve 1 of FIG. 6A, illustrating a configuration in which the slide plate 2 is positioned to unblock the pipe opening 3.

The slide valve 1 has, in a manner known per se, a slide plate 2 (see FIGS. 6A-B) which is displaceably mounted in a housing 23 and unblocks and closes a pipe opening 3 (see FIGS. 6A-B). The drive means shown in FIG. 1 is provided for the stroke movement of the slide plate 2 required for operating the valve 1. The drive means is electrically or pneumatically or hydraulically actuated and has for that purpose an electric motor 11 or a pneumatic motor or a hydraulic motor which is connected to the rod system of the drive means by way of a gear. Specifically, the drive means has a rod 14, especially a slide rod, which is connected to the slide plate 2 (see FIGS. 6A-B).

It should be pointed out here that the drive means is disclosed and claimed both together with the slide plate 2, i.e. in conjunction with the entire slide valve 1, and by itself, that is to say without the slide plate or the associated slide valve. In that respect the rod 14 is claimed as connected to the slide plate 2 or connectible thereto, as may be understood from at least FIGS. 6A-B.

Figure 2:
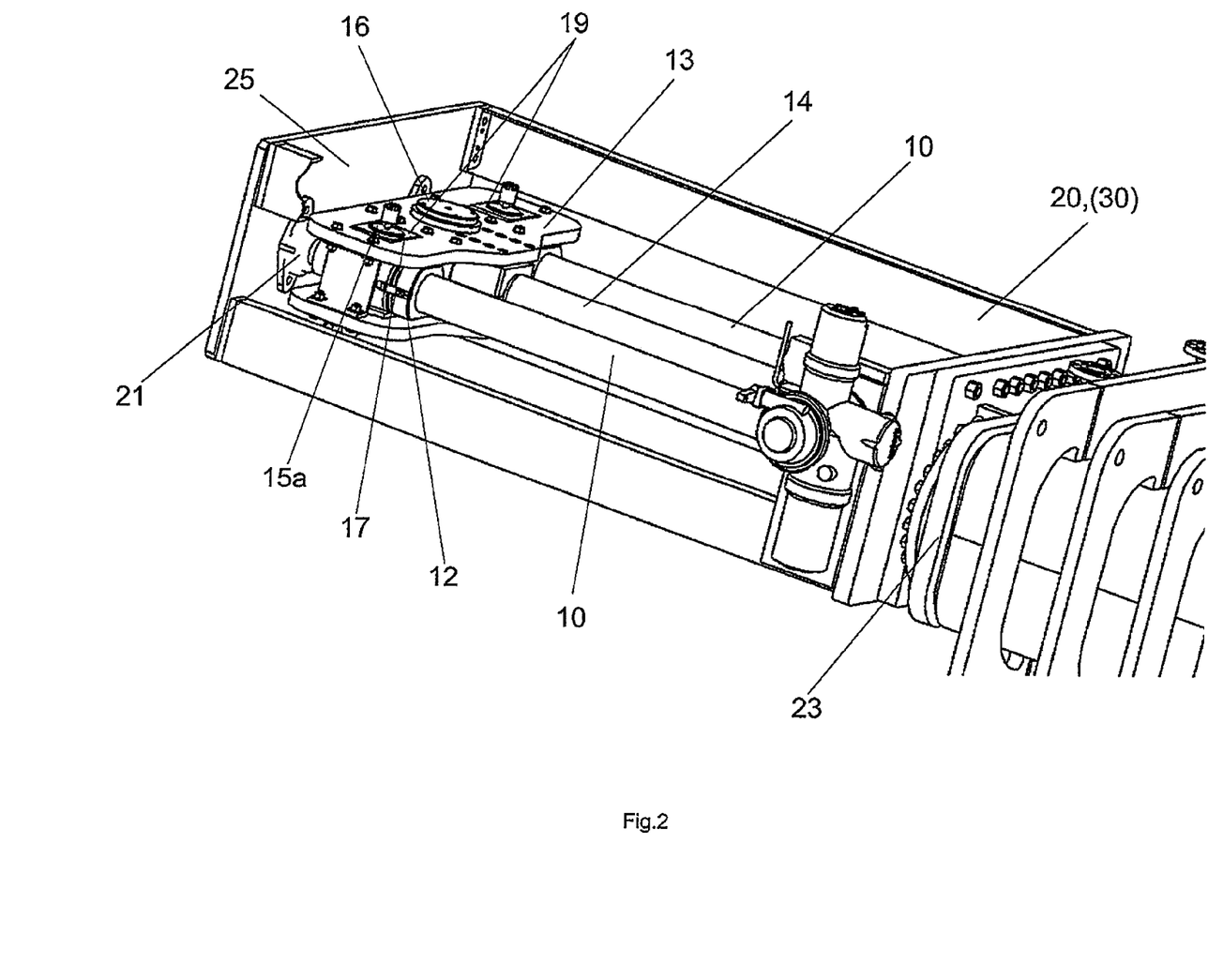
FIG. 2 shows the drive means according to FIG. 1 in the open position of the valve.

As can be seen in FIG. 2, which shows the drive means in the extended position, that is to say in the open position of the valve, the rod 14 is arranged centrally between two parallel spindles 10. The rod 14 and the two spindles 10 are arranged in parallel in approximately the same plane, especially in the same plane. As can also be seen in FIG. 2, the rod 14 is a single rod which connects the drive means to the slide plate. Instead of the single rod 14 it is also possible to use a plurality of rods, especially two rods, arranged between the spindles 10 and connected to the slide plate.

The rod 14 is attached centrally to the proximal end of the slide plate, that is to say to the drive-side end of the slide plate (not shown). The diameter of the rod 14 is in each case slightly greater than the diameter of a spindle 10. Other dimensional ratios are possible.

Figure 3:
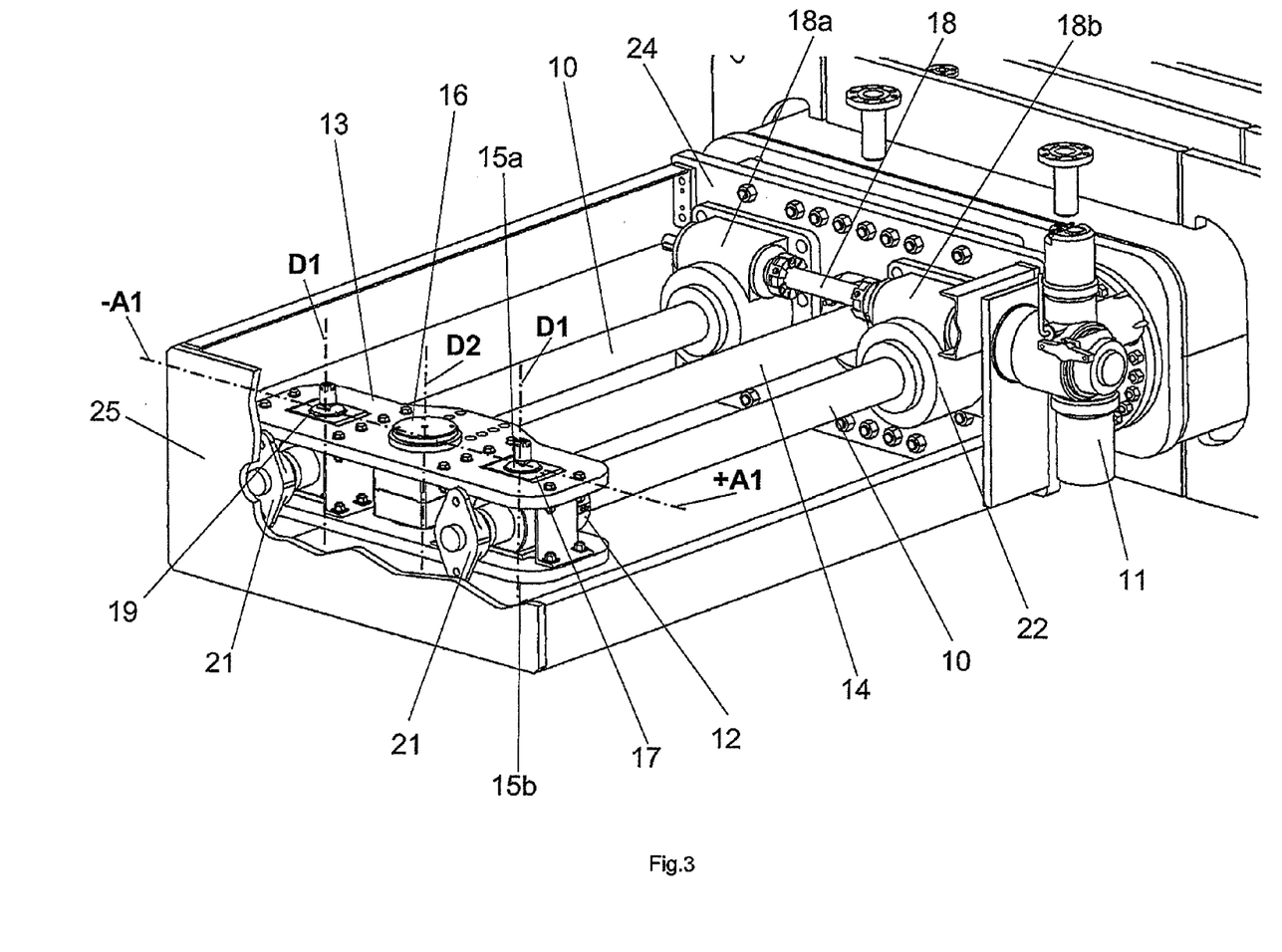
FIG. 3 is a further perspective view of the drive means in the position in accordance with FIG. 2, part of the rear plate of the frame having been removed to show the drive components located behind it.

The spindles 10 are trapezoidally threaded spindles or worm spindles which allow self-locking. The two spindles 10 are driven in rotation by a common motor 11, preferably an electric motor 11. For that purpose there is provided an angular gear having a drive shaft 18, especially a worm shaft 18 (see also FIG. 3). The worm shaft 18 has a first worm portion 18a and a second worm portion 18b, each of which meshes with a spindle 10. The worm gears are each arranged in a housing 22. The worm shaft 18 is connected to the electric motor 11, the use of which is preferred. The electric motor 11 or some other possible motor is arranged laterally of the two spindles 10 and flange-mounted on the frame 20 of the drive means. Some other arrangement of the common motor 11, for example central arrangement above the rod 14, is possible. It is also possible to provide each spindle 10 with its own motor, for example an electric motor, the two motors being synchronised for the synchronous operation of the spindles 10.

For transmitting the drive force from the two spindles 10 to the rod 14 there is provided a cross-yoke 13, i.e. a cross-member, the longitudinal extent of which runs perpendicular to the spindles 10. The cross-yoke 13 and the spindles 10 are connected by travelling nuts 12. The two spindles are therefore arranged in fixed position and the conversion of the rotational drive movement of the spindles 10 into a translational movement is effected in a manner known per se by the longitudinal movement of the travelling nuts 12 along the spindles 10.

The travelling nuts 12 are for that purpose connected to the cross-yoke 13 so as to be fixed against rotation about the longitudinal axis of the spindle. As a result, in a manner known per se, rotation of the spindles 10 causes the respective travelling nut 12 in engagement with the spindle 10 to be moved in the longitudinal direction of the spindle. The two travelling nuts 12 carry with them the cross-yoke 13 and the rod 14 which is connected to the cross-yoke 13. In that way, the stroke movement or the axial movement of the rod 14 and consequently the actuation of the slide valve is achieved.

In the exemplary embodiment, the articulated connection between the travelling nuts 12 and the cross-yoke 13 is achieved by connection of the travelling nuts 12 to the cross-yoke 13 so that they are each rotatable about a first pivot axis D1 which runs perpendicular to the spindles 10. Furthermore, the sliding blocks 19, in which the two pivot pins 15a, 15b of the travelling nuts 12 are received, allow axial play, in directions +A1 and −A1, in the associated guide slots 17 located in the cross-yoke 13. The sliding-contact bearings 27 fix the respective travelling nuts 12 against rotation about the longitudinal axis of the spindles (fixed against rotation about the longitudinal axis of the spindles). The pivot pins 15a, 15b and the sliding blocks 19 and the guide slots 17 allow rotation of the travelling nut 12 relative to the cross-yoke 13 about the first pivot axis D1 perpendicular to the spindle 10 and axial movability of the travelling nuts 12 relative to the cross-yoke 13 in directions +A1 and −A1. The directions +A1 and −A1 run substantially in the longitudinal direction of the cross-yoke 13, that is to say substantially transversely with respect to the longitudinal axes of the spindles. Other bearing arrangements are possible.

Figure 5:
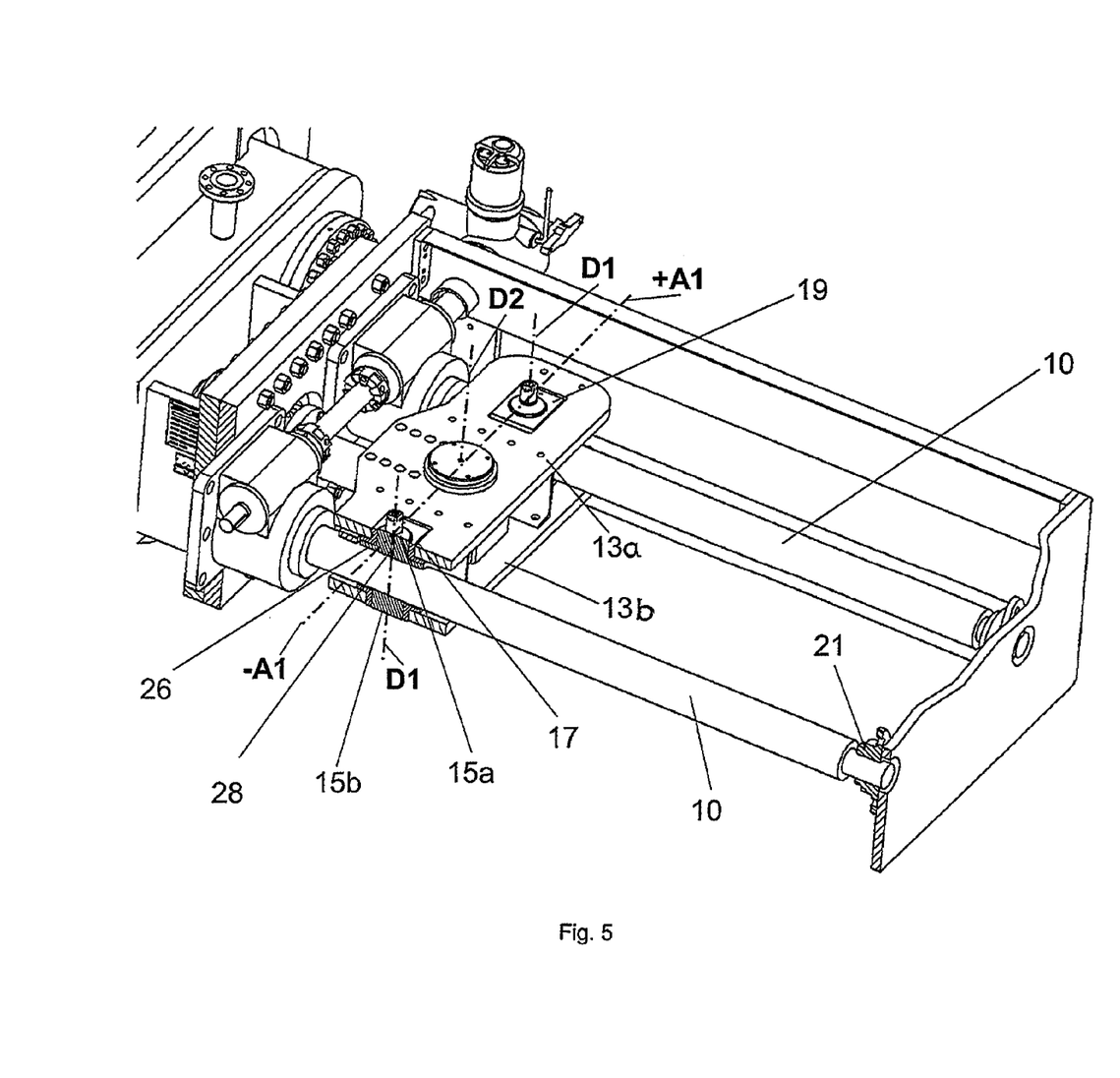
FIG. 5 is a further perspective view of the drive means in the position in accordance with FIG. 1, parts of the frame having been removed to provide a better view of the drive means.

The construction of the two travelling nuts 12 can be seen most clearly in FIG. 5. The travelling nuts 12 each have a bore 26 having an internal thread which engages the external thread of the respective spindle 10. The two travelling nuts 12 each have a first pivot pin 15a which is mounted in the cross-yoke 13 so as to be rotatable about the first pivot axis D1. The first pivot pin 15a runs perpendicular to the longitudinal axis of the bore 26 and is arranged in the sliding block 19 which is connected to the cross-yoke 13 by way of the guide slot 17. The diameter of the first pivot pin 15a is sufficiently large to transfer the drive forces occurring during operation from the travelling nuts 12 by way of the cross-yoke 13 to the rod 14. For example, the diameter of the first pivot pin 15a is at least ⅓, especially at least ½, of the diameter of one of the spindles 10.

The two travelling nuts 12 each have a second pivot pin 15b which is arranged opposite the first pivot pin 15a and is mounted in the cross-yoke 13 so as to be rotatable about the same first pivot axis D1 as the first pivot pin 15a. The mounting of the second pivot pin 15b in the cross-yoke 13 is effected in a corresponding way to the mounting of the first pivot pin 15a by means of a sliding block 19. All the features of the first pivot pin 15a are disclosed in connection with the second pivot pin 15b.

In the first pivot pin 15a there is provided a lubricant supply means 28 for lubricating the travelling nuts 12. The lubricant supply means has a channel which extends along the first pivot axis D1 through the first (upper) pivot pin 15a as far as the spindle 10 and which is connected to a lubricant container.

The two travelling nuts 12 are of corresponding construction.

The rod 14, especially the free end of the rod 14, is likewise articulatedly connected to the cross-yoke 13, more specifically by means of a pivot joint 16 which is joined to the cross-yoke 13 so as to be movable about a second pivot axis D2 and which transfers axial forces for the stroke movement of the rod 14. The pivot joint 16 is arranged centrally between the travelling nuts 12 in the cross-yoke 13. In normal operation, that is to say in the normal arrangement of the cross-yoke 13, the pivot axes D1, D2 of the travelling nuts 12 and the rod 14 intersect a common line which runs perpendicular to the spindles 10. The first and second pivot axes D1, D2 run parallel to one another and are perpendicular to the spindles 10 and to the rod 14, respectively.

The cross-yoke 13 is therefore articulatedly connected both to the two spindles 10 by way of the travelling nuts 12 and to the rod 14. In the event of a skewed position of the cross-yoke 13, for example as a result of different running speeds of the travelling nuts 12, the cross-yoke 13 can therefore rotate about the second pivot axis D2. The pivot pins 15a and 15b of the travelling nuts 12 each rotate about the first pivot axis D1, while the sliding blocks 19 perform an axial compensating movement in direction +A1 or −A1 in the respective guide slots 17. As a result, the cross-yoke 13 is prevented from canting. Despite the skewed position of the cross-yoke 13, further operation of the slide valve is possible.

The cross-yoke 13 has two parallel plates 13a, 13b, spaced apart from one another, which are arranged above and below the two spindles 10. The first pivot pin 15a of the respective travelling nut 12 is pivotally mounted in the first plate 13a arranged above and the second pivot pin 15b is pivotally mounted in the second plate 13b arranged below. In addition, the pivot joint 16 of the rod 14 is arranged between the two plates 13a, 13b. The two plates 13a, 13b form a crossbar in which the two travelling nuts 12 are mounted by means of the sliding-contact bearings 27 so as to be fixed against rotation about the longitudinal axis of the spindles but rotatable about the first pivot axis D1 running perpendicular to the longitudinal axis of the spindles.

It can be seen in FIGS. 1 and 2 that the spindles 10 are mounted in a frame 20. For that purpose there are provided spindle bearings 21 (see FIGS. 2 and 3) which are attached by screws to a rear plate 25 of the frame 20. The front plate 24 of the frame 20, which is arranged parallel to the rear plate 25, carries the housings of the drive gears 22 of the spindles 10. The front plate 24 is joined, especially screwed, to an end face of the housing 23 of the slide valve. The front plate 24 and the rear plate 25 are joined to one another by struts 30. Instead of the frame 20 it is also possible for some other kind of housing to be provided for the drive means.

Figure 4:
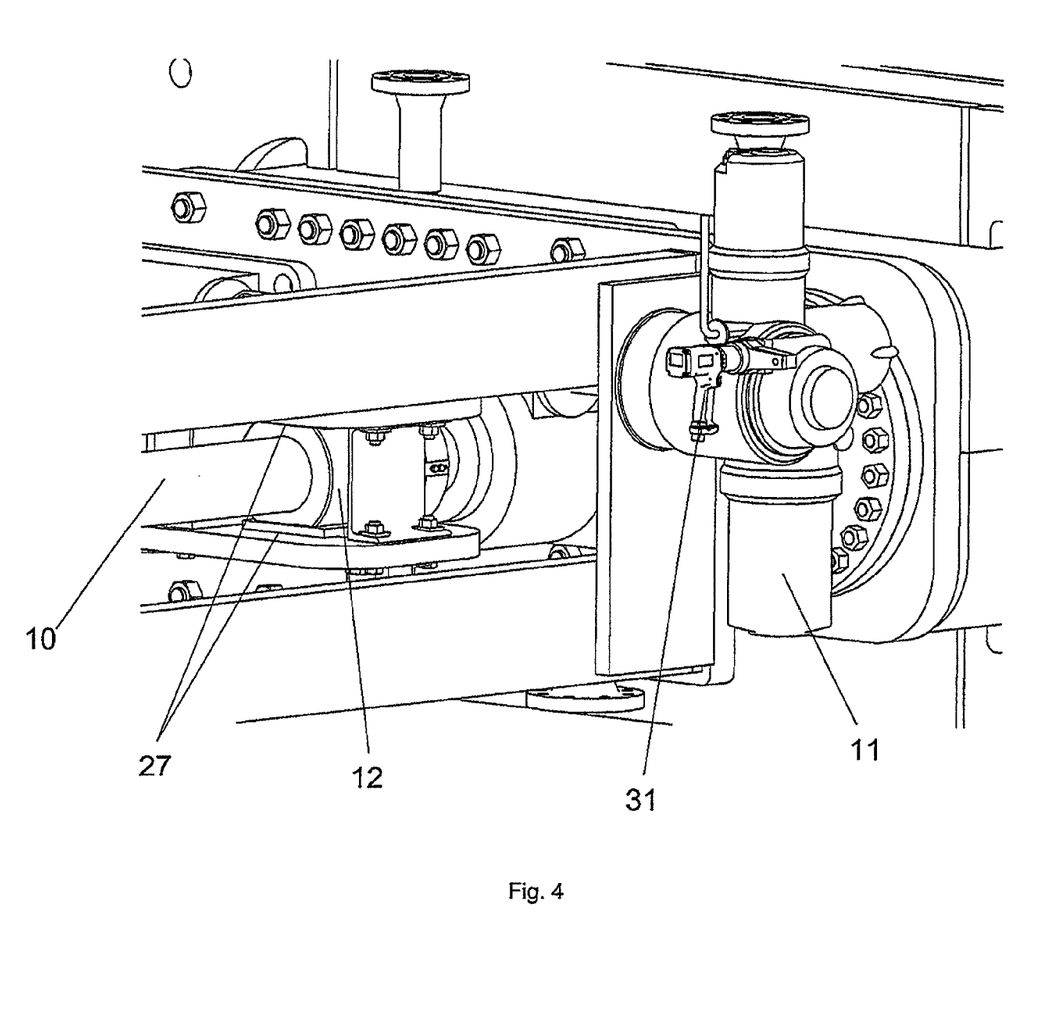
FIG. 4 is a detail view of the motor in accordance with FIG. 1.

FIG. 4 shows an exemplary embodiment in which a pneumatic emergency actuation means 31 is provided on the drive unit.

The drive unit described above is distinguished by its especially small overall height or overall length in comparison with other drive units. By virtue of the spindle drives, the drive means has a very compact design. In addition, automatic central lubrication is possible, so that the drive means operates without maintenance over a long period. The construction is economical, because predominantly standard bought-in parts can be used. The drive means is versatile and can be used for a variety of different valve fittings, especially special-purpose valve fittings. The drive means is particularly suitable for use in conjunction with an electric motor, especially for delayed coker operation.

REFERENCE NUMERALS 10 spindle
11 motor
12 travelling nut
13 cross-yoke
14 rod
15a, 15b pivot pin
16 pivot joint
17 guide slot
18 worm shaft
19 sliding block
20 frame
21 spindle bearing
22 drive gear/worm gear
23 housing
24 front plate
25 rear plate
26 bore
27 sliding-contact bearing
28 lubricant supply means
29 not used
30 struts
31 emergency actuation means

The invention claimed is:

1. Drive means for a slide valve having two parallel spindles (10) which are driven in rotation by at least one motor (11), travelling nuts (12) which engage the spindles (10) and are movable in the longitudinal direction of the spindles by rotation of the spindles (10), and a cross-yoke (13) which is arranged transversely with respect to the spindles (10) and is connected to the travelling nuts (12) on the one hand and to a rod (14) on the other hand, which rod is arranged in parallel between the spindles (10) and is connected or connectible to a slide plate, the rod (14) being axially movable by the motor (11) for the actuation of the slide plate, wherein the travelling nuts (12) and the rod (14) are each articulatedly connected to the cross-yoke (13) via respective pivot joints.

2. Drive means according to claim 1, wherein the travelling nuts (12) each have at least one pivot pin (15a) which is mounted in the cross-yoke (13) so as to be pivotable about a first pivot axis (D1), the first pivot axis (D1) running perpendicular to the spindles (10) in each case.

3. Drive means according to claim 1, wherein the travelling nuts (12) each have two pivot pins (15a, 15b) which are arranged opposite one another and are both mounted in the cross-yoke (13) such said sets of two pivot pins (15a, 15b) are all pivotable about a first pivot axis (D1).

4. Drive means according to claim 1, wherein the travelling nuts (12) are mounted so as to be axially movable in the longitudinal direction (A) of the cross-yoke (13).

5. Drive means according to claim 4, wherein the cross-yoke (13) has apertures (17) in which sliding blocks (19) are arranged so as to be axially movable in the longitudinal direction (A) of the cross-yoke (13), the travelling nuts (12) each being mounted between the sliding blocks (19) so as to be fixed against rotation about the longitudinal axis of the spindles but rotatable about a pivot axis running perpendicular to the longitudinal axis of the spindles.

6. Drive means according to claim 5, wherein the pivot axis running perpendicular to the longitudinal axis of the spindles is a first pivot axis (D1).

7. Drive means according to claim 1, wherein the free end of the rod (14) is connected to the cross-yoke (13) by way of a pivot joint (16) which is movable about a second pivot axis (D2) running perpendicular to the rod (14).

8. Drive means according to claim 1, wherein the spindles (10) are connected to the motor (11) by a common drive shaft.

9. Drive means according to claim 8, wherein the common drive shaft comprises a worm shaft (18).

10. Drive means according to claim 1, wherein the spindles (10) are mounted in a frame (20) via spindle bearings (21) and are connected to drive gears (22), the frame (20) comprising a front plate (24) connectible to a housing (23) of a slide valve and a parallel rear plate (25) spaced apart therefrom, housings of the drive gears (22) being attached to the front plate (24) and the spindle bearings (21) being attached to the rear plate (25).

11. Drive means according to claim 1, wherein the motor (11) comprises an electric motor, pneumatic motor or hydraulic motor.

12. Slide valve having a drive means according to claim 1.

13. Drive means for a slide valve having two parallel spindles (10) which are driven in rotation by at least one motor (11), travelling nuts (12) which engage the spindles (10) and are movable in the longitudinal direction of the spindles by rotation of the spindles (10), and a cross-yoke (13) which is arranged transversely with respect to the spindles (10) and is connected to the travelling nuts (12) on the one hand and to a rod (14) on the other hand, which rod is arranged in parallel between the spindles (10) and is connected or connectible to a slide plate, the rod (14) being axially movable by the motor (11) for the actuation of the slide plate, wherein the travelling nuts (12) and the rod (14) are each articulatedly connected to the cross-yoke (13), and wherein the travelling nuts (12) each have at least one pivot pin (15a) which is mounted in the cross-yoke (13) so as to be pivotable about a first pivot axis (D1), the first pivot axis (D1) running perpendicular to the spindles (10) in each case.

14. Drive means for a slide valve having two parallel spindles (10) which are driven in rotation by at least one motor (11), travelling nuts (12) which engage the spindles (10) and are movable in the longitudinal direction of the spindles by rotation of the spindles (10), and a cross-yoke (13) which is arranged transversely with respect to the spindles (10) and is connected to the travelling nuts (12) on the one hand and to a rod (14) on the other hand, which rod is arranged in parallel between the spindles (10) and is connected or connectible to a slide plate, the rod (14) being axially movable by the motor (11) for the actuation of the slide plate, wherein the travelling nuts (12) and the rod (14) are each articulatedly connected to the cross-yoke (13), and wherein the free end of the rod (14) is connected to the cross-yoke (13) by way of a pivot joint (16) which is movable about a second pivot axis (D2) running perpendicular to the rod (14).

\* \* \* \* \*